United States Patent
Gunnarsson et al.

[11] Patent Number: 5,929,584
[45] Date of Patent: Jul. 27, 1999

[54] TOOL CENTER POINT CALIBRATION APPARATUS AND METHOD

[75] Inventors: Kristjan Tomas Gunnarsson; James Simpson Hemmerle, both of Pittsburgh, Pa.

[73] Assignee: PHT, Inc., Pittsburgh, Pa.

[21] Appl. No.: 09/067,164

[22] Filed: Apr. 27, 1998

[51] Int. Cl.$^6$ .................................................. G05B 19/401
[52] U.S. Cl. ........................ 318/568.16; 318/652; 901/42
[58] Field of Search .............................. 318/567, 568.11, 318/568.13, 568.14, 568.16, 568.21, 652; 901/9, 10, 41, 42; 33/502, 503, 504

[56] References Cited

U.S. PATENT DOCUMENTS

| | | | |
|---|---|---|---|
| 4,899,094 | 2/1990 | Pilborough | 318/567 |
| 5,373,222 | 12/1994 | Hemmerle et al. | 318/652 |
| 5,457,367 | 10/1995 | Thorne | 318/568.11 |
| 5,649,368 | 7/1997 | Herzog et al. | 33/502 |

*Primary Examiner*—Bentsu Ro
*Attorney, Agent, or Firm*—Buchanan Ingersoll, P.C.

[57] ABSTRACT

A method for calibrating the center point of a tool attached to a robot face plate or other machine uses a calibration block having vertical and horizontal faces. The position of the tool center point is determined by moving the tool from a starting position to touch one of the faces, recording the location of the face plate and returning the tool to the starting point. This is repeated for the other surfaces. Then the tool center point can be calculated from the recorded locations. Also disclosed is a calibration block having a centering area with four walls arranged to form a parallelogram and a leveling area with four walls arranged to form an x, y coordinate axis.

17 Claims, 10 Drawing Sheets

TOOL CENTER POINT CALIBRATION APPARATUS AND METHOD

BACKGROUND OF THE INVENTION

1. Field of the Invention

The present invention provides a method and apparatus to precisely calibrate a so-called tool center point of a tool, or end-effector, mounted to the face plate of a robotic machine to point locations in three dimensional space. Use of the method ensures the accuracy of programs that command placement of a tool in three dimensional point locations.

2. Description of the Prior Art

A robotic machine is a machine that is composed of a series of links, or arms. Each arm is controlled by an actuator that moves the arm relative to the preceding arm. A controller, executing statements of an application program, commands the actuation of each arm and calculates the resulting configuration of the arm and including the location and orientation of its last link. A robotic machine is manufactured to exacting mechanical tolerances and uses precise sensors and electronics. Consequently the controller commands the actuators with great precision and calculates the configuration and location and orientation of the arm with a great degree of accuracy. The objective of manipulating the machine is to place the center point of a tool, which is attached to the end, or face plate, of the last link in a specified location in space. The tool is normally not part of the machine but is attached to it by the user. Tools vary in size and their attachment is subject to considerable uncertainty. The user is responsible for specifying the definition of the tool he has attached to the face plate to the robot controller as a configuration data item. A tool definition is a vector of six dimensions: the first three coordinates specify the location of the tool center point relative to the face plate, and the last three coordinates specify the orientation of the tool center axes relative to the face plate. The robotic controller uses this tool definition to solve the basic equation of manipulation (formulated below as a linear system of four rows by four columns matrices):

$$\text{Tool\_Location} = T6 * \text{Tool\_Def} \quad (E1)$$

where the Tool_Location is a six dimensional vector specifying the position and orientation of the tool in three dimensional space, T6 is a traditional designation specifying the location and orientation of the face plate and is a six dimensional vector. In the equation above, the user specifies Tool_Location through his application program. The user also specifies the tool definition, i.e. Tool_Def, as a configuration parameter in the robot controller. The controller uses the equation to calculate the T6 vector to ensure that the tool will be placed where the user has specified. However, it is apparent that if errors exist in the tool definition, errors will result in the controller's calculation of the arm configuration (T6), and eventually in the commanded tool location possibly rendering the application useless. From this, it follows that methods to precisely determine tool definition are needed. Additionally, these methods need to be simple and quickly applied because a tool definition is subject to both sudden and gradual change requiring re-calibration. Sudden changes can result from collision between the tool and its environment slightly altering its location relative to the face plate. Gradual changes can result from wear and use and other environmental effect.

A tool center point is a three dimensional vector. It is the first three coordinates of a six dimensional tool definition vector. The orientation vector must also be specified by the user. However, applications are normally not as sensitive to uncertainties in the orientation vector, and the orientation vector can be determined more easily than the tool center point. The method presented herein can be used to determine the orientation vector for tools that are symmetric about their axis. An example of such a tool is an arc welding torch.

Vendors of robotic machines give their customers instructions for determining the definition of tools that the users mount on their robots. The first step is normally to measure with rulers the approximate location of the tool center point relative to the face plate. This is a crude and highly inaccurate method with uncertainty on the order of an inch. The next level of sophistication calls for the user to fix a point (a bull's eye) in space in front of the robot and adjust the value of the tool center point through trial and error until the same location is reported by the robot controller when the point or bull's eye is approached from various directions. This is a time consuming method highly dependent on the skill, determination and effort of the operator for success. Even under the best circumstances an uncertainty of more than ½ inch must be assumed for this method. A further improvement instructs the operator typically to rotate manually the tool relative to the vertical and horizontal directions which are assumed to be aligned with the internal coordinate system of the machine. The user either eye balls the vertical and horizontal alignments or uses levels. The tool tip is again brought into light contact with the bull's eye from opposite directions. Software in the controller records the users manual operations and estimates the true value of the tool center point. Again this is a time consuming, iterative process, highly dependent on the operator's skill, effort and patience for its success. With time and careful operation the tool center point can possibly be estimated to within 2 mm which is on the margin of a successful calibration.

An automatic method for calibration of a tool center point is disclosed in U.S. Pat. No. 5,457,367. The method uses a light beam and an iterative search procedure. Many users would prefer not to purchase and set up the light and sensors required by this method. Consequently, there is a need for a method that uses touch sensing instead of disruption of a light beam for measurement of location of the tool during the calibration process.

Methods have been devised for the calibration of robotic manipulators and are offered by the vendors of such devices such as Dynalog and CSI Robotics. These methods and devices are intended to determine the values of the parameters used by a controller to calculate the configuration and location and orientation of the face plate as function of the amount of individual joint actuation. These methods do not apply to tool calibration as they are used with a user's tool removed from the face plate and a special calibration device attached in its stead.

There is a need for a simple, efficient and mathematically exact method and associated apparatus for determining the tool center point of robotic tools. Additionally, such a methods should be able to determine the tool definition of axis symmetric tools such as an arc welding torch.

SUMMARY OF THE INVENTION

The present invention provides a method and apparatus for the calibration of tool center point of robotic tools, and the calibration of the tool definition of axis symmetric robotic tools. The calibration apparatus is any metallic, electrically conducting block placed in an arbitrary but fixed location within the machine's operating envelope. The electrical contact created by the tool touching the calibration block is used to indicate the location of the tool. Electrical contact is but one method of sensing touch contact; other methods of contact sensing can be used without changing the function and usefulness of the methods described.

In one embodiment of the invention the calibration block is a rectangular block with a smaller rectangle removed from its top plane so that a corner with stepped edges is formed. This corner can be of arbitrary angle but ninety degrees is the preferred embodiment. In another embodiment the calibration block is formed by removing solid triangular wedges from the top plane and out from the center of a solid rectangular block leaving a star shaped cluster of corners with stepped edges. In another embodiment the calibration block is formed by creating thin vertical fins lying along lines that form a rectangular cross in the middle of the calibration block. The fins are truncated so that they do not meet and cross at the center but leave a free space in which a tool can be placed and moved to and into contact with the top edges of the fins.

The present invention includes a method for calculating the center point of a robotic tool, and calculating the tool definition of an axis symmetric tool. The method includes the steps of calibrating the fixed location, both position and orientation, of the calibration apparatus within the robot's envelope. The method includes the steps of measuring the location of the robotic tool by bringing it under robot control into electrical contact with the calibration apparatus and from those contact measurements calculating the tool center point.

BRIEF DESCRIPTION OF THE DRAWINGS

FIG. 7b is a enlarged view of the vectors shown in FIG. 7a.

BRIEF DESCRIPTION OF THE PREFERRED EMBODIMENTS

Figure 1:
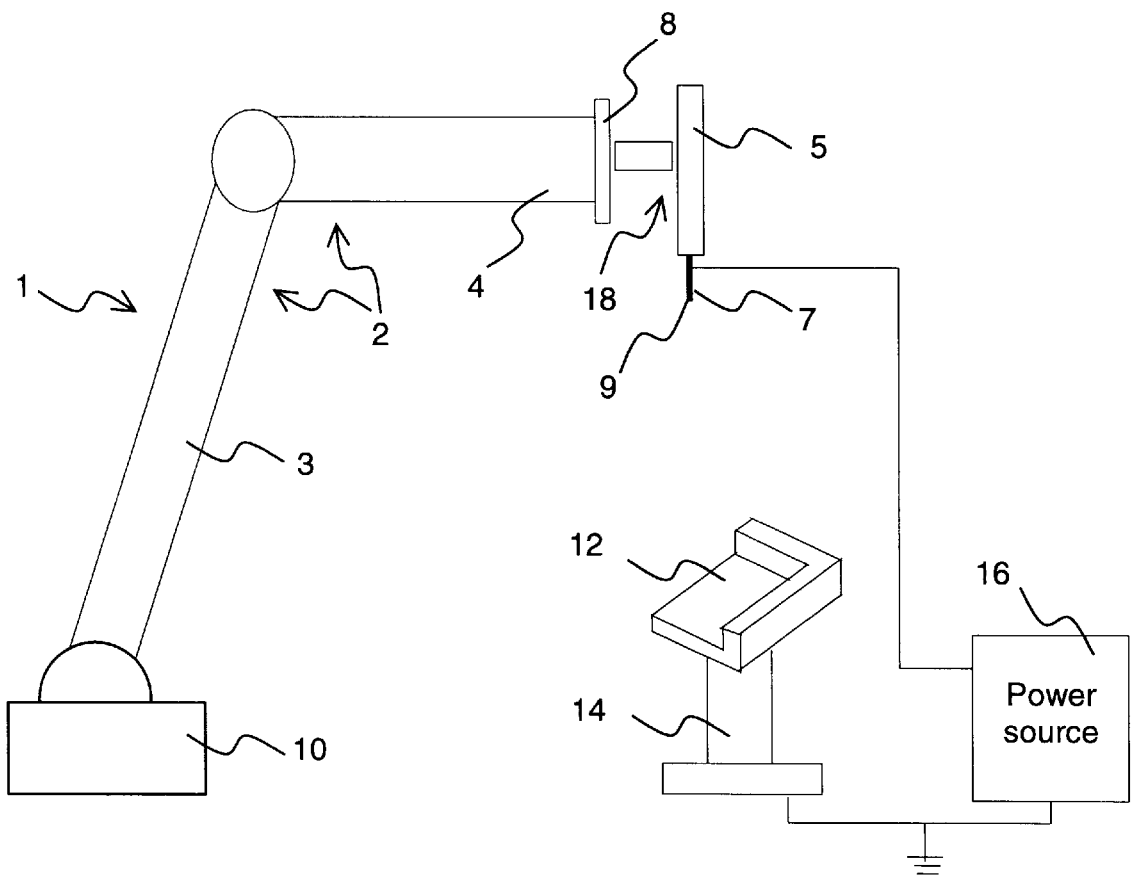
FIG. 1 is a diagram of a robot arm positioned near and electrically connected to a calibration block.

A typical robot 1 shown in FIG. 1 has a base or main body 10 from which an arm 2 extends. The arm typically has two or more interconnected segments 3 and 4. These segments are connected so as to pivot or rotate about one or two axes. Thus, the end of the arm can be positioned within a space called the work envelope of the robot. There is a face plate 8 on the distal end of the robot arm to which a tool 5 having a tip 7 is attached. There is a point 9 at the distal end of tip 7 that is the tool center point. The tool center point can be more clearly seen in FIG. 4. In the diagram of FIG. 1 there is a tool calibration apparatus 12 on a stand 14 placed within the work envelope of a robot. The calibration apparatus comprises only the block. This calibration block is a rectangular block with a smaller rectangle removed from its top plane so that a corner with stepped edges is formed. This corner can be of arbitrary angle but ninety degrees is the preferred embodiment. The block can be mounted anywhere within the robot's envelope in an arbitrary location except for the constraint that the robot must be able to bring the tool to it and move the tool around it. The calibration apparatus can be mounted on a stand, or any fixed surface such as fixtures used to hold work pieces. The figure shows that the calibration apparatus 12 and stand 14 electrically tied in with the ground of a power source 16 that supplies electrical potential to the tool. That so-called touch sensing via electrical contact between a robotic tool and a work piece is an established sensing technique in industrial robotics and is provided by the vendor as a built-in feature. It is not part of the present invention, which only uses and requires this feature.

The present method of calibrating a tool center point follows a procedure of two distinct steps. The first step is to determine the location of the calibration apparatus within the robot's envelope. This is a setup procedure and it is in two steps. The first step is to calibrate manually a pointer fixed to the face plate. The second step is to measure the location, position and orientation, of the calibration block using the calibrated pointer. This procedure is performed only when the calibration block is first placed within, or moved within, the robot's envelope. The second step is the actual procedure of tool center point calibration.

Figure 2:
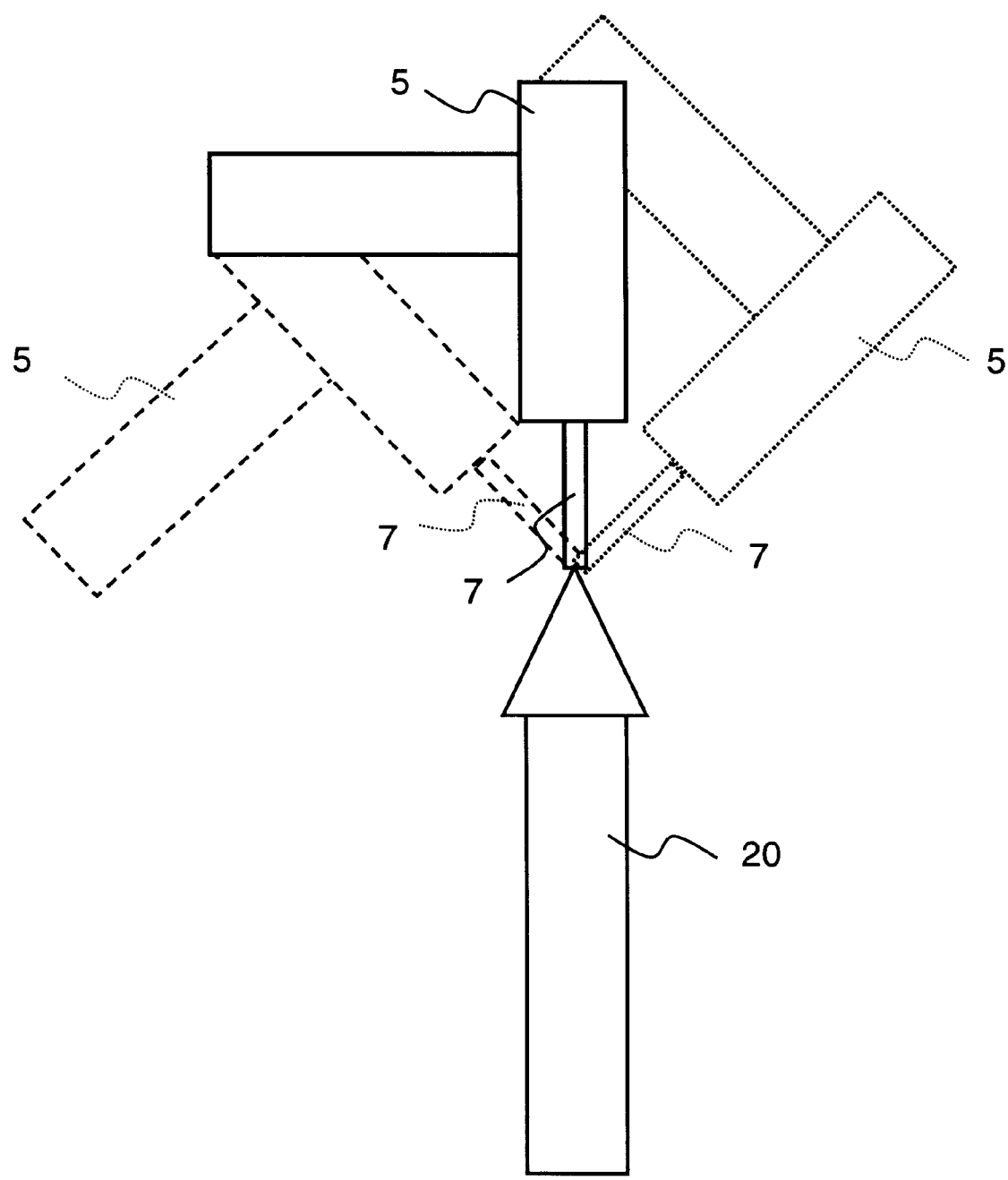
FIG. 2 is a diagram illustrating an initial setup procedure using a pointer.

During initial setup procedure, the operator fixes a pointer 20 shown in FIG. 2 in front of the robot well within its operating envelope so that the tool can be moved to the pointer in various and substantially different orientations. The operator fixes another pointer (not shown) [jsh 1] to the face plate 8 of the robot. Alternatively, the operator simply uses the existing tool provided it has a clearly defined and sharp end point or tip. The operator moves or jogs the tip in a fixed attitude or pose until it is in very close proximity to the fixed pointer. The operator relies on his eyesight and diligence to do this. A motivated operator is expected to be able to bring the two pointers' tips together to within ½ the diameter of the larger tip. The location of the face plate is recorded or stored when close proximity has been obtained. This operation is termed a measurement and is given a sequential index number. The operator repeats this operation at least three more times each time with the mounted pointer in a different pose. This is illustrated in FIG. 2. This procedure can be executed by an experienced operator in under a minute.

From the four or more measurements it is possible to determine, a) the coordinates of the face plate mounted pointer 18 with respect to the face plate 8, and b) the coordinates of the fixed pointer 20 with respect to the robot's operating space. This is done by formulating a least squares optimization problem by insisting that if the correct coordinates of the face plate pointer are found, then the sum of the squared variations in the calculated location of the fixed pointer is minimal, ideally zero, but allowing for a small residual error due to inaccuracies in manual measurement and robotic sensors.

We designate the first measurement as the baseline with index 0. For background, we note that traditionally the location of a robot's face plate is designated as 'T6 matrix.' T6 expresses both position and orientation of the face plate with respect to the robot's operating space in a 4 rows by 4 columns matrix. The first 3×3 diagonal sub-matrix is the orientation part of the face plate. The first three rows of the last column is the position part of the face plate. We can now formally express the true coordinates of the reference pointer as:

$$P_p = T6_0 t^*, \text{ or} \tag{E2a}$$

$$P_p = R_0 t^* + P_0 \tag{E2b}$$

where $P_p$ is the true position vector of the fixed reference pointer expressed in the robot's world frame, $R_0$ is the orientation part of the T6 location for measurement number 0, $P_0$ is the T6's positional element, and $t^*$ is the true value of the tool tip. Both $t^*$ and $P_p$ are unknown and are to be determined.

The formula above is of general validity and applies to the other measurements:

$$P_i = R_i t^* + P_i, \text{ for all } i=1,2,3,\ldots \tag{E3}$$

A variational position vector can now be formulated:

$$DP_i = R_i t^* + P_i - (R_0 t^* + P_0), \text{ or} \tag{E4a}$$

$$DP_i = (R_i - R_0)t^* + (P_i - P_0), \text{ or} \tag{E4b}$$

$$DP_i = DR_i t^* + DP_i, \text{ for all } i=1,2,3,\ldots \tag{E4c}$$

A cost function is formed, whose value will be minimized by proper selection of $t^*$:

$$C(t^*) = \Sigma DP_i^2 = \Sigma (DR_i t^* + DP_i)^2, \text{ for all } i=1,2,3,\ldots \tag{E5}$$

$C(t^*)$ is differentiated with respect to $t^*$ and equated to zero:

$$dC = 2\Sigma(DR_i'DR_i t^*_{opt} + DR_i'DP_i) = 0. \tag{E6}$$

The result is that the optimal value, i.e. one that minimizes the cost function, and the best estimate of the true value of the tool tip in a least squares sense is:

$$t^*_{opt} = -(\Sigma DR_i'DR_i)^{-1}(\Sigma DR_i'DP_i). \tag{E7}$$

Now use (E2a) to calculate a best estimate of the fixed reference pointer's true position. Note, that if somehow the location of the fixed reference pointer had been known, then by (E2a) and with only one measurement, the tool tip's coordinates with respect to the face plate could have been determined. Now that the fixed reference pointer's location has been determined, and as long as it is left in its place, then a manual tool point calibration can be performed by moving the point on the tool to be calibrated into very close proximity to the fixed pointer. Use the formula (E8) below to calculate the coordinates of the point with respect to the face plate.

The above result (E7) is practical and easily implemented. An experienced robot operator should be able to make the four measurements, and run a program to perform the above calculations in under 1 minute.

During the second step of the setup procedure the operator places the calibration block 12 in its position. He enters the coordinates of the calibrated tip as the position of the tool definition. This allows using the robot as a three dimensional position measuring device. The operator jogs the tip, calibrated according to the first step of the setup procedure described above, to the three points indicated in FIG. 3 and measures their location in the robot's operating space by reading the controller's computed location of the tip. A coordinate system, i.e. a location, can be formed by the three measured points $P_1$, $P_2$, and $P_3$ using standard orthogonalization procedures and selecting point $P_1$ as the position of the location. The conditions placed on the three block localization points is, a) the corner point must be measured, and b) the other two points must be one on each edge forming the corner. Although, the preceding has described a manual procedure it is possible to automate the calibration of the block by touch sensing of the three faces that meet in the corner (point $P_1$). This procedure is done only once when the calibration block is placed in its position or if it is moved. In practice, the block should be re-calibrated periodically for safety. This concludes the second and final step of the setup procedure.

Figure 3:
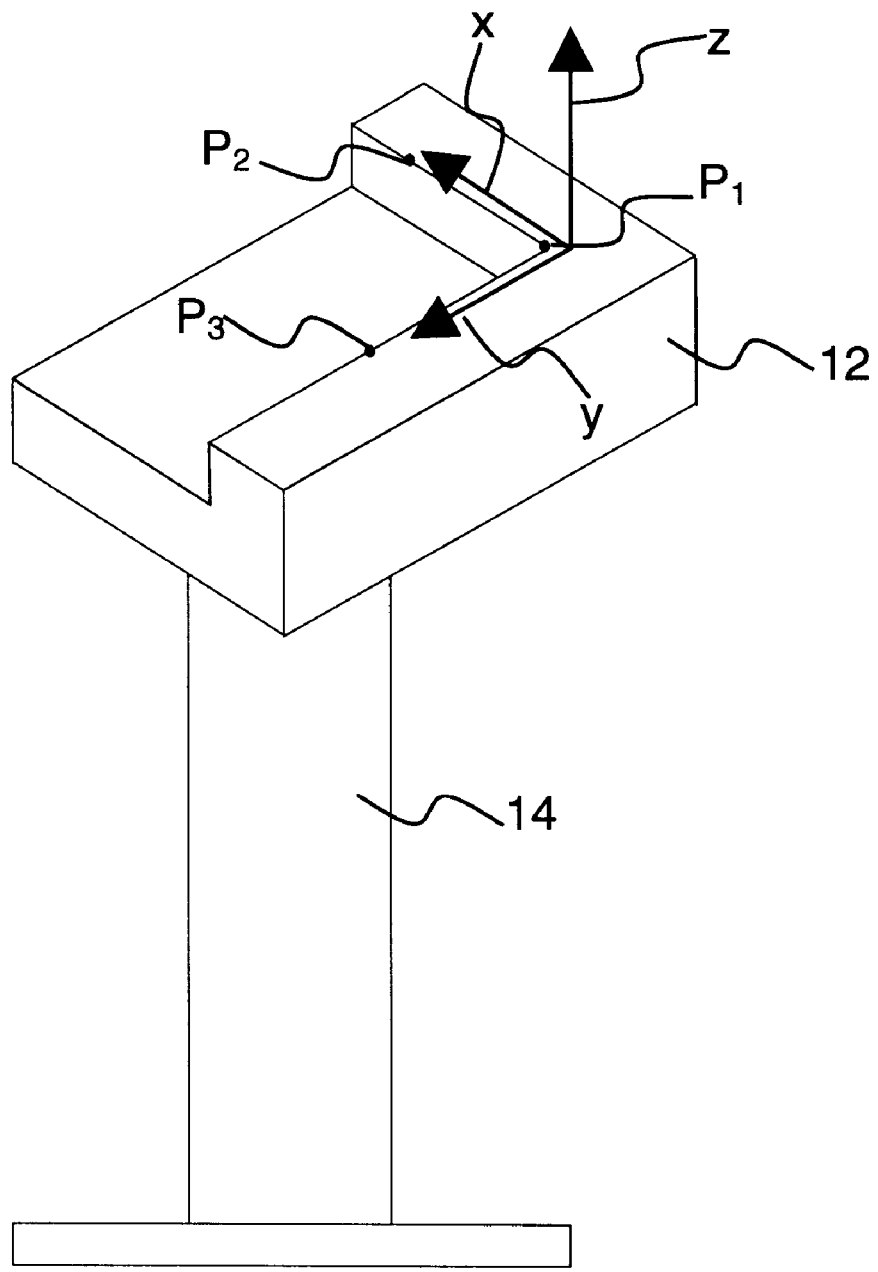
FIG. 3 is a perspective view of a first preferred calibration block on a stand.
Figure 4:
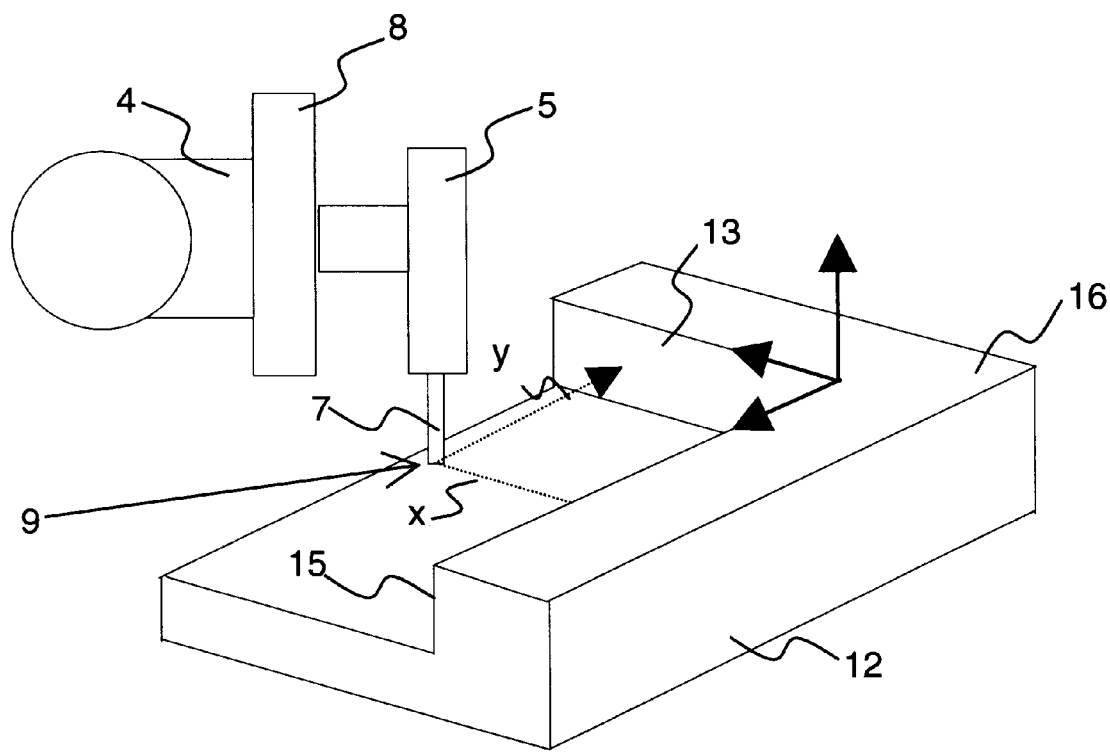
FIG. 4 is a perspective view of the calibration block shown in FIG. 3 with the initial position of the tool shown adjacent the block.

The second step is the actual calibration of a tool center point. The operator attaches the tool, whose center point is to be calibrated, on the robot's face plate. The operator also enters an approximate tool definition into the robot controller. The operator may use the vendor's prescribed method of setting the tool definition, or he can use the fixed pointer to set the tool's center point, or any combination of methods. The approximate tool definition should be accurate to within 1½ inches in position and to within 15 degrees in orientation. The approximate tool definition is needed so that the tool can be brought into the vicinity of the calibration block as shown in FIG. 4. FIG. 4 shows the tool center point 9 (the distal end if the tool tip 7 in this case) in relation to the calibration block 12. The automatic tool center point calibration is based on two concepts, a) touch sensing to measure the location of the tool point relative to the calibration block, and b) the definition of a point as the intersection of three planes. If the tool center point can be brought into contact with the intersection point then the tool center point can be calculated as:

$$TCP = T6^{-1} P_{ip} \tag{E8}$$

where TCP is the tool center point vector relative to the face plate, T6 is the location of the face plate at the moment of contact, $T6^{-1}$ is the inverse of the face plate's location, and $P_{ip}$ is the calibrated location of the intersection point (point $P_1$ of FIG. 3).

Figure 5:
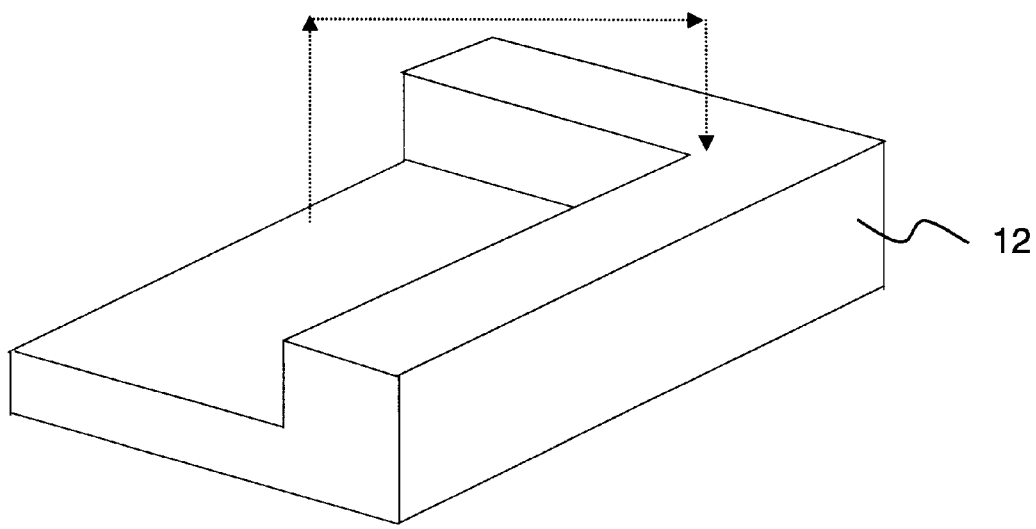
FIG. 5 is a perspective view similar to FIG. 4 with a path that the tool can travel during calibration being shown in chain line.

We define $T6_0$ as the location of the face plate of the tool's initial location in FIG. 4. A vector relative to the initial location can be determined that will move the tool center point 9 into contact with the intersection point. This vector is determined first by moving the tool center point 9 along the broken line y (this direction is along the y unit vector) (see FIG. 3 for definition of unit vectors' directions) until contact with the face 13 of the block is made. The distance to the face 13 is calculated as the distance between the initial position and the contact point on face 13. The same is done for the other face 15 by moving the tool center point 9 along the dotted line x (in the x direction). The distance to that face 15 is calculated also. A two dimensional vector can be computed now that will move the tool center point into the edge between the two faces 13 and 15 somewhere below the intersection point of the three faces 13, 15 and 16. This vector is:

$$v_{xy} = -d_1 {}^*x - d_2 {}^*y \tag{E9}$$

where $d_1$ and $d_2$ are the distances from the initial position to the respective faces, and x and y are unit vectors of the calibration block's location. The tool is now raised so that its center point rises above the top face 16 of the calibration block 12. The tool is moved in the direction of the $v_{xy}$ vector a distance a little greater than the length of the $v_{xy}$ vector, and is then moved down until light contact is made with the top face of the calibration block thereby following the path shown in FIG. 5. The difference in height between the initial position and the contact position at the top of the calibration block is calculated. The height is defined in terms of the distance along the z unit vector of the calibration block's location. The vector that will move the tool center point 9 from the initial location into contact with the intersection point is:

$$v = -d_1*x - d_2*y + d_3*z \qquad (E10)$$

where $d_3$ is the vertical distance from the initial location to the contact point on the top face 16 of the calibration block 12, and z is the third unit vector of the calibration block's location. The tool center point 9 is now calculated as:

$$TCP = (T6_1)^{-1} P_{ip} \qquad (E11)$$

where $T6_1$ is the location of the tool 5 when the vector of equation (E10) has been applied to the position part of $T6_0$. Although the preceding has indicated that the corner of the calibration block is a right angle of 90 degrees the method is equally applicable to a corner of an arbitrary angle with slight modification of equation (E11)

The calibration procedure above is now repeated but this time with a different length of extension of the tool center point. By equation (E11) a new TCP is calculated, i.e. $TCP_{ext}$. The axis of the tool is now calculated as the normalized vector difference between $TCP_{ext}$ and TCP. This vector becomes the z-unit vector of the tool definition. Since the tool is axis symmetric the rest of its orientation relative to the face plate is arbitrary. The y-unit vector is calculated so that it lies in a plane parallel to the plane of the face plate:

$$y_z = 0, z_x*y_x + z_y*y_y = 0, y^2_x + y^2_y = 1 \qquad (E12)$$

where $z_x$ and $z_y$ are the x and y coordinates of the tool's axis (z unit vector), and $y_x$, $y_y$ and $y_z$ are the coordinates of the y unit vector. Finally, the x vector is calculated as the vector product of the z and y unit vectors:

$$x = y \text{ cross } z \qquad (E13)$$

The automatic method just described uses a so-called one measurement technique. It does not give an optimal estimate of the tool center point; there's only a single measurement, and it is not fully automatic; there's a manual setup procedure involved. A procedure is described below by which the calibration is performed automatically without manual setup. Furthermore, it is possible to do this practically, i.e. efficiently and accurately. This procedure requires, as before, an initial rough estimate of the tool definition, and it requires knowledge of the orientation of a calibration block, but not its precise location.

Figure 6:
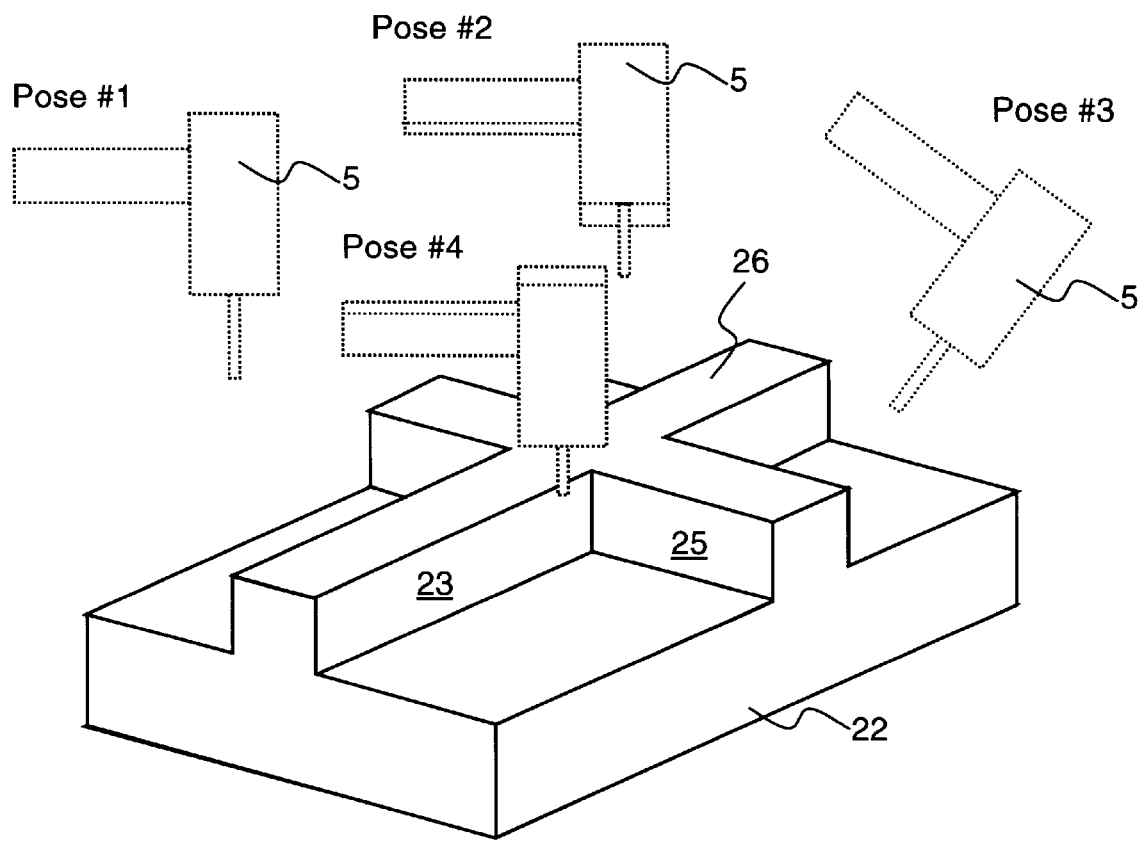
FIG. 6 is a perspective view of a second preferred calibration block with four poses or positions of the tool being shown in chain line.

The basic procedure for manually calibrating a pointer or tool point with respect to the face plate is to measure the same point repeatedly but in different orientations (a.k.a. 'poses'). It is possible to perform the three touches procedure of FIG. 4 repeatedly (four times or more), but maintaining a different orientation, or pose, during each set of three touches. This has the effect of measuring the intersection point with the different orientations, just like in the manual procedure using a reference pointer. Because it is important to space the orientations out to get a numerically sound calculation, the calibration block needs to be modified to a shape similar to the second preferred calibration block 22 shown in FIG. 6. Note that other shape configurations are possible; this is just one that will serve the purpose.

The modified calibration block 22 has four (4) intersection points instead of one intersection point in calibration block 12. This complicates the mathematical procedure above only slightly in that offsets need to be added to the four measurements—a 'measurement' is taken to be a three touches procedure with a fixed orientation—to account for the difference in reference or intersection point for each measurement. The additional requirement here is that the relationship between the four corner intersection points must be known precisely. This is a matter of making a one-time measurement of the block after it has been fabricated. Equations (E7) is still used to calculate the optimal estimate of the tool center point as before.

Figure 7A:
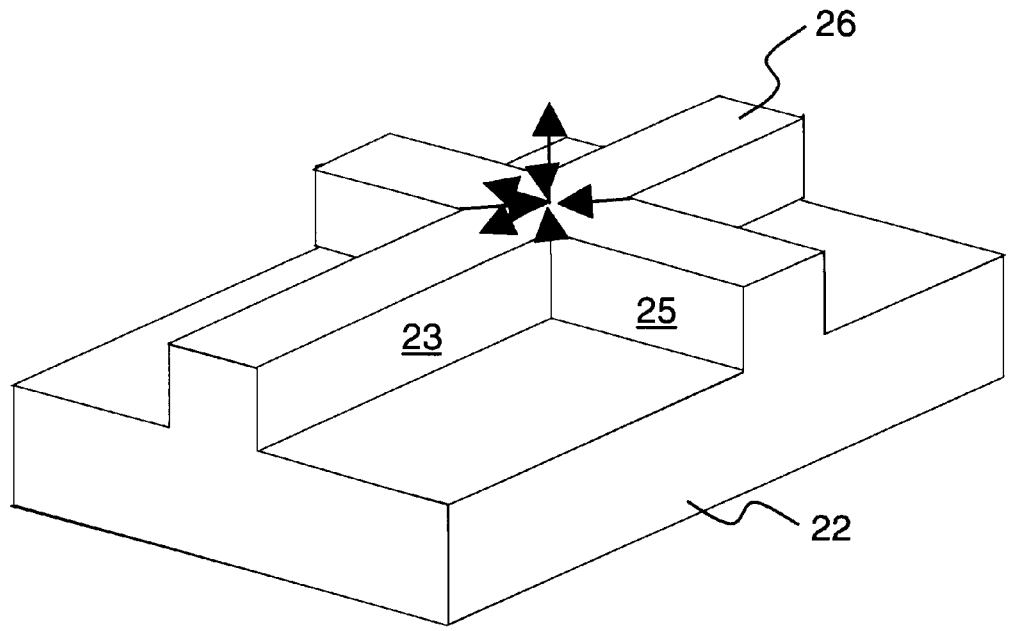
FIG. 7a is a perspective view of the calibration block shown in FIG. 6 on which vectors that show the relationship among the four intersection points are indicated.
Figure 7B:
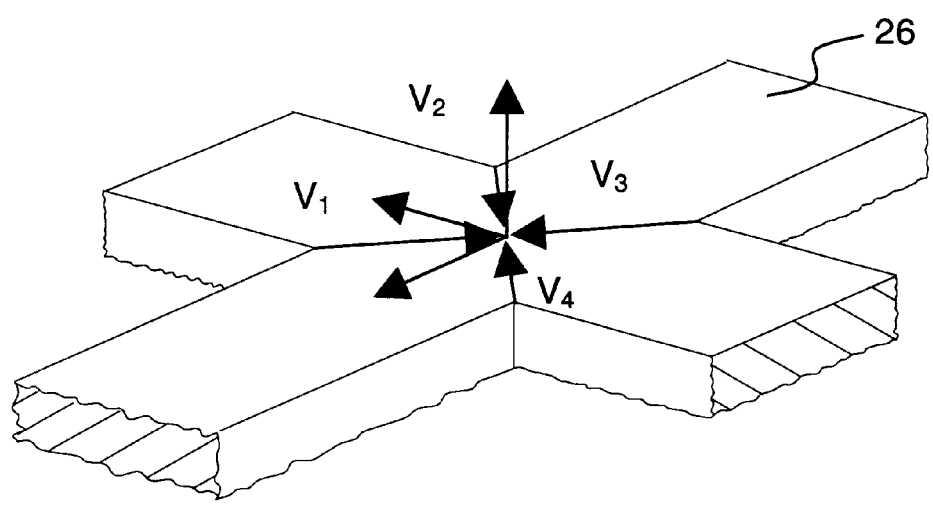

FIGS. 7a and 7b show offset vectors $v_1$ through $v_4$ that define the relationships between the four intersection points of the top face 26 with each pair of adjacent vertical faces 23 and 25 and the location of the calibration block 22. These vectors are added to the vectors of equation (E10) calculated from the respective three touches procedures. The vectors $v_1$ through $v_4$ must be measured and known for the calibration block 22. Taking the measurement using pose number one of FIG. 6 as an example, the results of a three touches procedure is that the vector of equation (E10) is determined. This vector is used to calculate $T6_1$ of equation (E11). Now, this vector is augmented by $v_1$ resulting in:

$$v = -d_1*x - d_2*y + d_3*z + v_1 \qquad (E14)$$

In turn this leads to $T6_2$ when the vector of equation (E14) is applied to the position vector of $T6_0$, i.e. the location of the face plate at the start of the three touches procedure. $T6_2$ is the location of the tool that would place the tool center point 9 at the location of the calibration block 22 in FIG. 7a. The same is applied to all four poses of FIG. 6 and the result is a set of face plate locations, $T6_2 p_1$ through $T6_2 p_4$. These locations are used in the procedure described by equations (E2a) through (E7) in place of the $P_i$ measurements. This results in the tool center point 9 being calculated along with the position of the calibration block 22.

This procedure can be further augmented to remove the requirement of knowing the orientation of the calibration block. The orientation of the calibration block is needed so that the vector of equation (E10) can be calculated. There are two ways of doing this. First, the three touch procedure can be modified to include two touches instead of each of the first two single touches, and three touches instead of the third single touch. Two touches spaced apart about one inch allows the calculation of the unit vector along the edge and the direction to the corner. The three touches of the previous third touch allow calculation of the plane of the top of the calibration block. The intersection point is then obtained as the intersection of lines along the two edge vectors when projected into the plane of the top of the calibration block. For the second way, the first two touches can be replaced by a procedure in which the first touch is replaced by two touches to determine a vector along the first edge, but the second touch remains a single touch. A priori knowledge of the corner angle is used to calculate the vector along the second edge given the direction of the first edge and the single touch on it.

Figure 8:
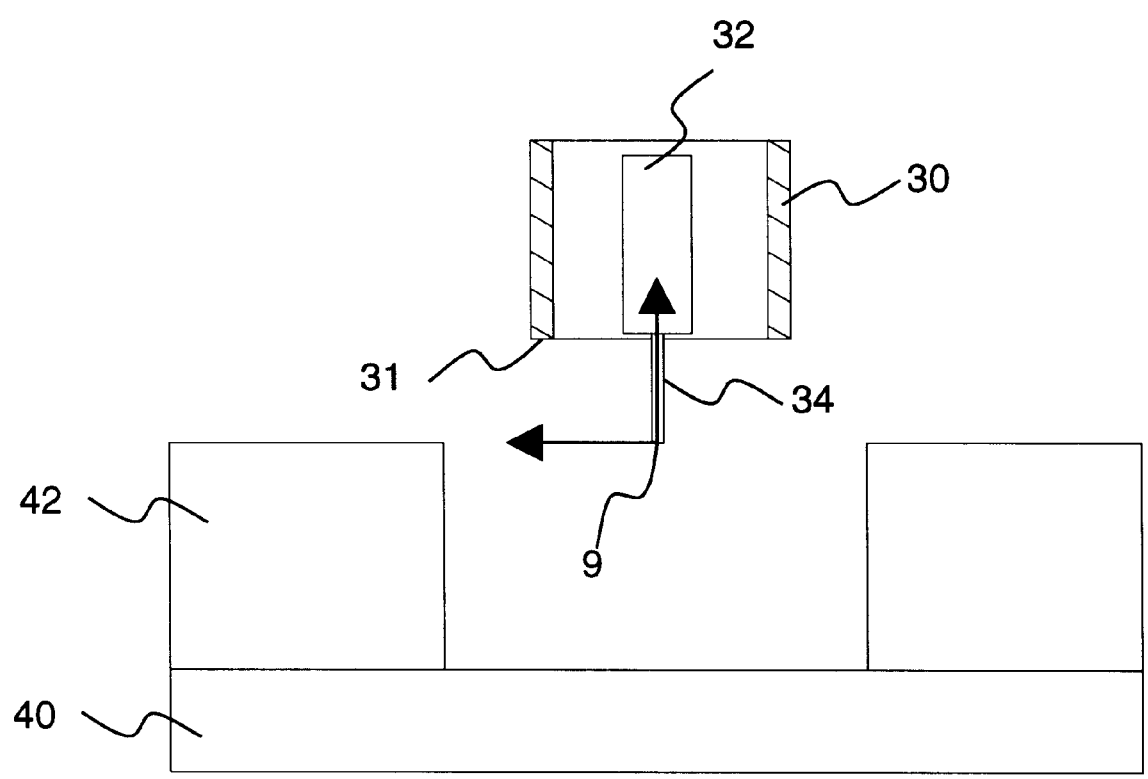
FIG. 8 is a front view of an arc welding torch tip shown partially in section positioned above a third preferred calibration block.

The present invention includes a method for the calibration of tools such as that of a torch used for gas metal arc welding (GMAW). For the process of GMAW it is often assumed that the intended tool center point 9 is along the axis extending through nozzle 30 and contact tip 32 and a specified distance beyond the rim of the nozzle. In the embodiment shown in FIG. 8 that stick out distance corresponds to the length of electrode 34. The method uses contact between the nozzle 30, used for directing flow of shielding gas, and a calibration block 40. The objective is to center and level the rim 31 of the nozzle 30 above a known location by the amount of stick-out. The location of this point is known a priori and equation (E8) in modified form is used to compute the tool center point. The method assumes that the approximate orientation of the nozzle and tool is known to within ±10°. This is reasonable because, as stated earlier the objective of tool calibration is to determine exactly the tool center point. Applications are sensitive to errors in tool center point, but not as sensitive to errors in orientation. Orientation changes in the tool are normally small and insignificant because tools are rigidly mounted, but nevertheless can lead to significantly large changes in tool center point. The method is performed in two steps: setup and calibration. The setup procedure is used to determine the location of the calibration block, where two locations are needed: the centering location and the leveling location. Setup is performed only once for each location of the calibration block. The second step, which is the actual calibration of the weld torch, is in two steps: centering the nozzle, and leveling and raising the nozzle.

Figure 9:
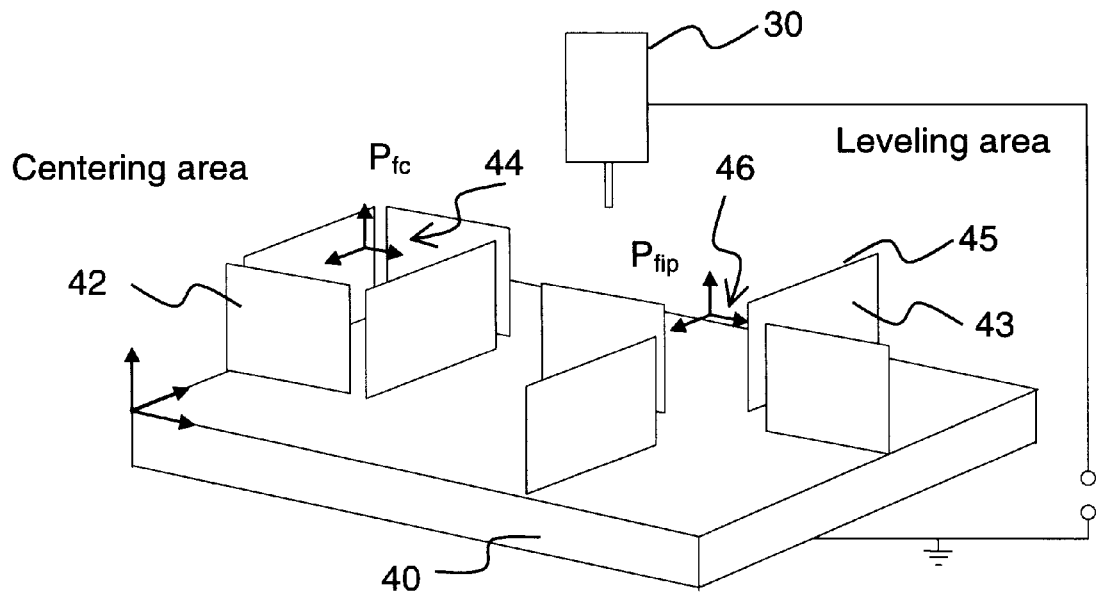
FIG. 9 is a perspective view of the welding tip and calibration block shown in FIG. 8.
Figure 10:
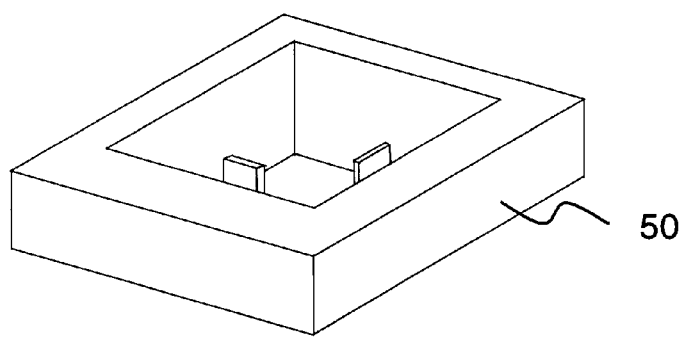
FIG. 10 is a perspective view of a fourth preferred calibration block.

FIG. 9 shows the fourth preferred embodiment of the calibration block 40. It should be understood that alternative embodiments exist and can be used to the same effect. One such alternative is the calibration block 50 shown in FIG. 10 where the centering areas and leveling areas are stacked on top of each other. When using calibration block 40 shown in FIG. 9 electrical contact is established between the nozzle 30 and fins 42 when the nozzle 30 touches a fin 42 or a surface of the block 40. Electrical contact is but one method of sensing contact between the nozzle 30 and fins 42. Alternative methods of sensing touch contact may be used. Calibration block 40 is composed of two areas for centering and leveling the nozzle respectively. The centering area has four fins 42 positioned to form a parallelogram enclosing a free space 44 large enough for a nozzle to be placed within it with about an inch of clearance in each direction. Associated with the centering area is its location placed at the height of and level with the surrounding fins 42, and directed along their faces as shown by the arrows adjacent fins 42. This location is determined during the setup procedure. The leveling area also contains four fins 43, but they are arranged along the lines of a cross-hair creating a free area 46 between them large enough for a nozzle to fit in between them with about an inch of clearance in each direction. The four fins can be viewed as positioned so as to define an x, y coordinate axis with four quadrants and spaced apart from one another so as to define an open area 46 which encompasses a portion of each quadrant. Associated with the leveling area is its location placed at the height of the fins 43, level with them and directed along their faces as shown by the arrows adjacent fins 43. This location is determined during the setup procedure.

The setup step is performed by calibrating a pointer or tool point relative to the robot's face plate. The calibrated pointer is brought manually into light contact with three corner points on the calibration block. This is indicated by the arrows at one corner of block 40. One corner point is chosen as the origin of the locating frame; the other two are used to calculate unit vectors along the edges of the block with the third unit vector calculated as the cross product of the first two. It is assumed that all locations on the block including the two calibration locations of the centering and leveling areas respectively are known from the block's design. Knowing the locating frame of the block thus leads to knowledge of the centering and leveling frames. The location of the centering and leveling frames is designated $P_{fc}$ and $P_{flp}$ respectively. This concludes the setup procedure.

Figure 11:
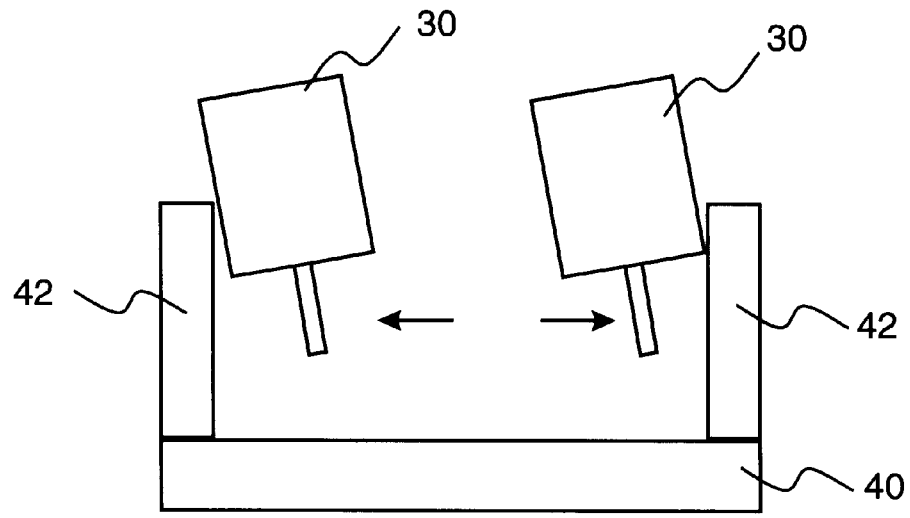
FIG. 11 is a diagram indicating the movement of the welding tip between two fins of the calibration block.

During the nozzle centering step the nozzle 30 is brought into the area between the fins 42 and below the plane of their top edges. The nozzle is moved toward the first fin in a direction along the fin's normal. When contact is made the motion is stopped and the nozzle is moved into contact with the opposite fin as indicated in FIG. 11. The average of the two moves is calculated and the nozzle moved to the average position between the two fins. This procedure is repeated for the remaining fins thus centering the nozzle within the area of the four fins. This concludes the centering procedure.

Figure 12A:
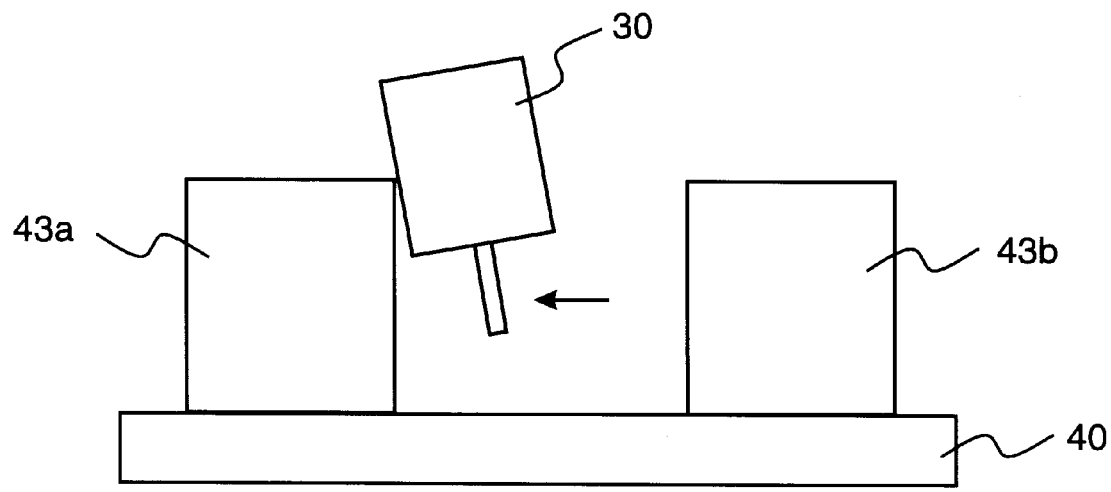
FIGS. 12a through 12c are diagrams showing movement of the welding tip around a fin.
Figure 12B:
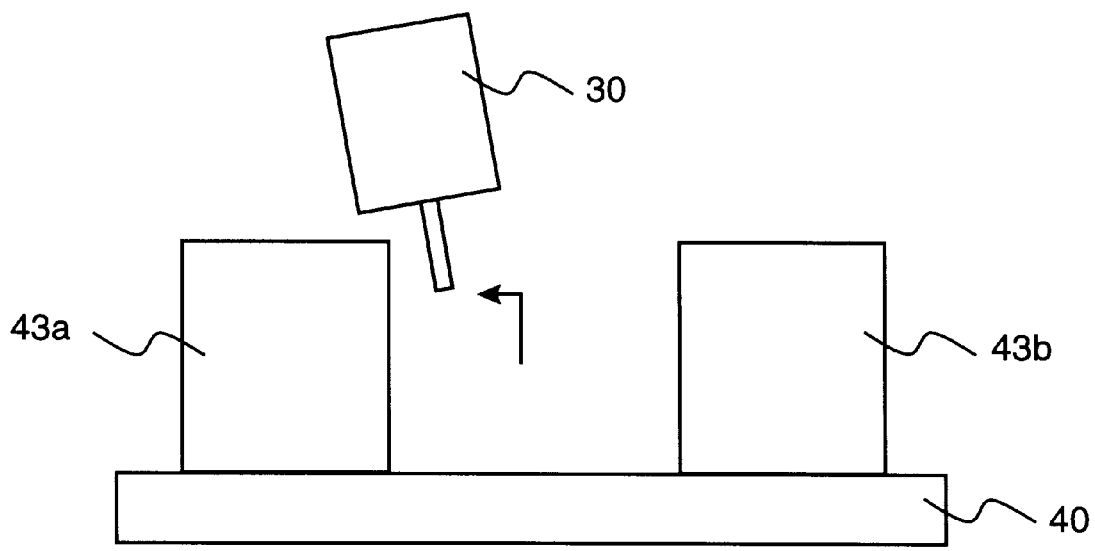
Figure 12C:
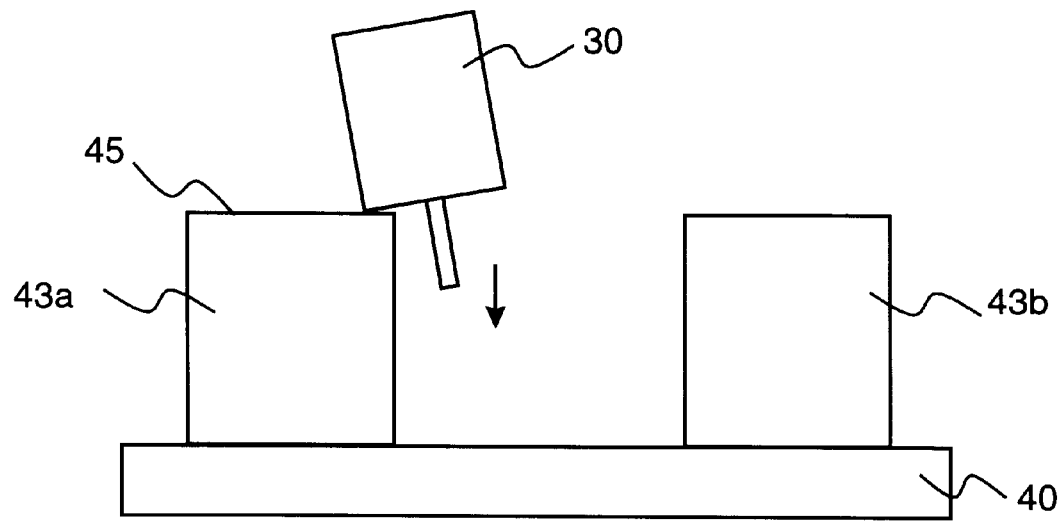

Because the relationship between the centering and leveling areas is known through their respective locations, i.e. $P_{fc}$ and $P_{flp}$, it is possible to move the nozzle over to the leveling area so that it is centered within it and below its top surface. The nozzle 30 is moved toward the vertical edge of the first fin 43a until contact is made as shown in FIG. 12a. The nozzle 30 is raised a fixed amount and moved further in the previous lateral direction a fixed amount which is illustrated in FIG. 12b. Finally the nozzle 30 is lowered until contact is made between the nozzle rim and top edge 45 of the fin 43a (see FIG. 12c). The location of the face plate at the point of contact is recorded and stored. This procedure is repeated for the other three fins. From the stored values of the four contact positions two rotations about the unit vectors defined by the cross-hair arrangement of the four fins are calculated and applied to tool location thus leveling the nozzle 30 relative to the top edges 45 of the fins 43. The nozzle is now moved to the center of the leveling area and to the level of the top edges of the fins 42 (see FIG. 8). It is now raised further in the vertical direction, i.e. along the z-unit vector, by the amount of the fixed stick-out. This location is recorded as $T6_f$. The TCP is now calculated as:

$$TCP = (T6_f)^{-1} P_{flp} \tag{E11}$$

Although FIG. 1 and the subsequent description explains use of the calibration method with a tool mounted on the face plate of a robotic arm the method is not limited to that particular application. The calibration method is applicable to all machinery that moves its end-of-arm surface in a calculated, coordinated fashion and that accepts attachment of a tool to its end-of-arm surface. A milling machine with more than a single degree of freedom that carries a bit in a chuck as end-of-arm tooling is an example where the calibration method can be used to determine the position of the bit's TCP relative to the end-of-arm tooling surface.

The figures show the tool center point or TCP as a physical point on the tool whose location is visible. The calibration method described herein is not limited to a physical TCP, but is equally applicable to a TCP that is projected into a fixed location in space relative to the physical tool. This occurs in some cutting tools and welding tools. An example is an electrode whose burn point is to be assumed in a fixed location relative to the nozzle directing shielding gas to the arc's plasma. Other examples include the hottest point of the flame of an oxy-fuel gas or plasma cutting torch. In these instances other physical points on the tool are calibrated using the described method and the TCP is then calculated and projected to the desired location relative to the calibrated points on the physical tool.

Although we have described and illustrated certain present preferred embodiments of our method for determining a tool center point and calibration blocks it should be distinctly understood that our invention is not limited thereto but may be variously embodied within the scope of the following claims.

We claim:

1. A method for tool calibration for a tool having a center point and attached to a face plate of a robot arm which robot arm can be positioned within a robot envelope wherein locations of the face plate within the robot envelope are known whenever the face plate is moved from one position to another, the method comprising:
   a. placing a calibration block having three intersecting planar faces within the robot envelope, the calibration block having a top face wherein the first planar face is parallel to the top face and the second and third planar faces intersect the top face;
   b. positioning the tool's center point in close proximity to the calibration block so that the tool can be moved to contact the planar faces of the calibration block;
   c. moving the tool's center point into contact with the second face from the position of step b the movement being along a line perpendicular to the second face;
   d. stopping the motion of the tool upon contact with the second face and storing a corresponding location of the face plate;
   e. moving the tool's center point back to the position of step b;
   f. moving the tool's center point into contact with the third face, the movement being along a line perpendicular to the third face;
   g. stopping the motion of the tool upon contact with the third face and storing a corresponding location of the face plate;
   h. moving the tool's center point back to the position of step b;
   i. raising the tool's center point above the top face of the calibration block;
   j. bringing the tool's center point to a contact point so that the tool is in electrical contact with the top face of the calibration block by moving the tool along a line that places the contact point, a short distance from a corner point defined by the intersection of the second and third faces;
   k. stopping the motion of the tool upon contact with the top face of the calibration block and storing a corresponding location of the face plate; and
   l. calculating coordinates of the tool's center point relative to the face plate from the stored locations of the face plate.

2. The method of claim 1 also comprising repeating steps b through k for a different extension of the tool along its axis before calculating the tool's center point.

3. The method of claim 2 wherein the tool has a contact point of known diameter and the extension is at least ten times the diameter of the tool's contact point.

4. The method of claim 1 wherein the tool is an arc welding torch.

5. The method of claim 1 wherein the tool center point is a point in space that is a distance from the tool which distance can be determined.

6. The method of claim 5 wherein the tool is a cutting tool that creates a flame or plasma and the tool center point is within the flame or plasma.

7. A method for tool calibration for a tool having a rim and a center point, the tool attached to a face plate of a robot arm which robot arm can be positioned within a robot envelope wherein locations of the face plate within the robot envelope are known whenever the face plate is moved from one position to another, the method comprising:
   a. placing a calibration block having two pairs of oppositely disposed walls which define an enclosed free space within the robot envelope, the walls each having a top edge and the top edges of the four walls being within a common plane and the calibration block having an area comprised of four fins arranged along lines of a cross-hair but separated by a fin free space between their facing edges;
   b. placing the tool so that the tool's center point is within the fin free space in a location that is below a plane passing through the top edges of the bounding walls; so that the tool can be moved to contact the walls of the calibration block;
   c. moving the tool into contact with the first wall from the position of step b;
   d. stopping the motion of the tool upon contact with the first wall of one pair of walls and storing a corresponding location of the face plate;
   e. moving the tool back to the position of step b;
   f. moving the tool into contact with the wall opposite the first wall;
   g. stopping the motion of the tool upon contact with the wall opposite the first wall and storing a corresponding location of the face plate;
   h. calculating an average position between the two walls that have been contacted and moving the tool's center point back to that position;
   i. repeating steps c through h for the other pair of walls; of the second and third faces;
   j. moving the tool's center point over the area composed of four fins arranged along the lines of a cross-hair but separated by a free space between their facing edges and placing the tool so that its center point is below the top edges of the fins;
   k. moving the tool toward the edge of the first fin until light contact is made;
   l. raising the tool a fixed distance and moving the tool further a fixed distance in a same direction that brought the tool into contact with the edge of the fin;
   m. moving the tool down until contact is made between the tool's rim and the top edge of the fin;
   n. stopping the motion and storing a corresponding location of the robot's face plate at the position of contact;
   o. reversing the motions of steps k through n;
   p. repeating steps k through o for the other three fins;
   q. calculating two rotations about the directions of the cross-hair arrangement of the fins, applying those rotations to the tool thus leveling it;
   r. moving the tool to the original center position between the fins, raising the tool up above the level of the top edges of the fins by an amount equal to desired tool stick-out and performing a tool center point calculation using a present location of the face plate and a known location of the leveling area.

8. The method of claim 7 wherein the tool is an arc welding torch.

9. The method of claim 7 wherein the tool center point is a point in space that is a distance from the tool which distance can be determined.

10. The method of claim 9 wherein the tool is a cutting tool that creates a flame or plasma and the tool center point is within the flame or plasma.

11. A method for tool calibration for a tool having a center point and attached to a machine to which tooling can be attached to a tool attachment location on the machine, the tool attachment location able to be positioned within an envelope wherein locations of the machine determines paths of motion of the tool attachment location within the envelope, the method comprising:

a. placing a calibration block having three intersecting planar faces within the envelope, the calibration block having a top face wherein the first planar face is parallel to the top face and the second and third planar faces intersect the top face;

b. positioning the tool's center point in close proximity to the calibration block so that the tool can be moved to contact the planar faces of the calibration block;

c. moving the tool's center point into contact with the second face from the position of step b the movement being along a line perpendicular to the second face;

d. stopping the motion of the tool upon contact with the second face and storing a corresponding location of the tool attachment location;

e. moving the tool's center point back to the position of step b;

f. moving the tool's center point into contact with the third face, the movement being along a line perpendicular to the third face;

g. stopping the motion of the tool upon contact with the third face and storing a corresponding location of the tool attachment location;

h. moving the tool's center point back to the position of step b;

i. raising the tool's center point above the top face of the calibration block;

j. bringing the tool's center point to a contact point so that the tool is in electrical contact with the top face of the calibration block by moving the tool along a line that places the contact point, a short distance from a corner point defined by the intersection of the second and third faces;

k. stopping the motion of the tool upon contact with the top face of the calibration block and storing a corresponding location of the tool attachment location; and l. calculating coordinates of the tool's center point relative to the tool attachment location from the stored locations.

12. The method of claim 11 also comprising repeating steps b through k for a different extension of the tool along its axis before calculating the tool's center point.

13. The method of claim 11 wherein the tool has a contact point of known diameter and the extension is at least ten times the diameter of the tool's contact point.

14. The method of claim 11 wherein the tool is an arc welding torch.

15. The method of claim 11 wherein the tool center point is a point in space that is a distance from the tool which distance can be determined.

16. The method of claim 15 wherein the tool is a cutting tool that creates a flame or plasma and the tool center point is within the flame or plasma.

17. A calibration block for determining a tool center point location relative to a robot face plate or tool attachment location comprising:

a. a planar base having a top surface a portion of which is a centering area and a second portion of which is a leveling area;

b. four walls attached to the centering area of the top surface so as to define a parallelogram having an open space within the walls; and c. four fins attached to the leveling area of the top surface, the fins positioned so as to define an x, y coordinate axis with four quadrants and spaced apart from one another so as to define an open area which encompasses a portion of each quadrant.

* * * * *

UNITED STATES PATENT AND TRADEMARK OFFICE
CERTIFICATE OF CORRECTION

PATENT NO. : 5,929,584
DATED : July 27, 1999
INVENTOR(S) : KRISTJAN TOMAS GUNNARSSON, JAMES SIMPSON HEMMERLE It is certified that error appears in the above-indentified patent and that said Letters Patent is hereby corrected as shown below:

Column 11, line 43, claim 1, change "comer" to --corner--.

Column 13, line 37, claim 11, change "comer" to --corner--.

Signed and Sealed this

Eighteenth Day of April, 2000

Attest:

Q. TODD DICKINSON

*Attesting Officer*  *Director of Patents and Trademarks*